No. 679,618. Patented July 30, 1901.
W. HANSON.
NUT LOCK.
(Application filed June 3, 1901.)
(No Model.)
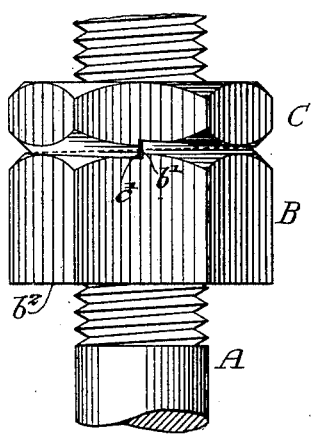
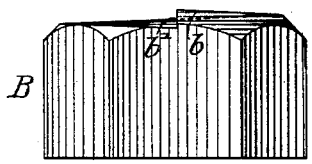
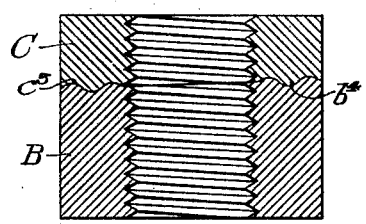
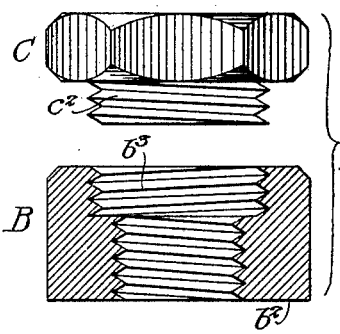
Witnesses:—
Inventor:—
William Hanson
by his Attorneys:—

UNITED STATES PATENT OFFICE.

WILLIAM HANSON, OF PHILADELPHIA, PENNSYLVANIA.

NUT-LOCK.

SPECIFICATION forming part of Letters Patent No. 679,618, dated July 30, 1901.

Application filed June 3, 1901. Serial No. 62,964. (No model.)

*To all whom it may concern:*

Be it known that I, WILLIAM HANSON, a citizen of the United States, residing in Philadelphia, Pennsylvania, have invented certain Improvements in Nut-Locks, of which the following is a specification.

My invention relates to certain improvements in lock-nuts, having for its object the provision of a device for rigidly retaining two threaded nuts in a desired position on a threaded bolt or screw or within a threaded recess. This object I attain as hereinafter set forth, reference being had to the accompanying drawings, in which—

Figure 1 is a side view of a bolt, showing my improved nut as applied thereto. Figs. 2 and 3 are side views of the main and auxiliary jam-nuts, respectively. Fig. 4 is a view of a modified form of my invention, and Fig. 5 is a sectional view of a modified form of the lock-nut shown in Figs. 2 and 3.

In the drawings, A is a threaded bolt or screw, and B is a nut constructed with similar threads of the ordinary type. C is a similar nut, threaded like the nut B and preferably of a less thickness than the same. The adjacent faces of these nuts, instead of being plane and at right angles to the axis of the bolt or screw, are made as wedge surfaces, as shown at $b$ and $c$ in Figs. 2 and 3, being parallel with each other. The offset or inclination of these wedge faces is made opposite to that of the screw-threads—*i. e.*, should one of the nuts be held stationary and the other turned in a direction to move it forward on the bolt-thread such motion would cause the second nut to move away from the one held stationary.

In use the nuts are placed together, the perpendicular edges $b'$ and $c'$ of their cam faces being in contact, and they are screwed onto the bolt or screw, the power for turning being applied to the nut B. When the flat face $b^2$ of this nut has been forced with the desired pressure onto the surface against which it is intended to remain, power is then applied to the nut C by means of a wrench or otherwise, and it is turned for a small distance in a forward direction, or the same as that in which the nut B was turned. Owing to the formation of the wedge faces, this causes the thread of a nut C to jam on the threads of the bolt or screw, thus rigidly holding it, as well as the main nut B, from any possible movement. When it is desired to loosen the nuts, the auxiliary or jam nut C is turned backward until its vertical edge $c'$ comes in contact with the edge $b'$ of the nut B, when both nuts may be unscrewed from the bolt in the ordinary manner.

If desired, my invention may be applied in the manner illustrated in Fig. 4, where the nut B is recessed and threaded, as at $b^3$, and the nut C is made with a threaded projecting portion $c^2$, constructed to enter the recess $b^3$. The threads on this projecting portion $c^2$ and in the corresponding recess are cut in the opposite direction to those on the bolt A and in the nuts C and B, and before starting the nuts on the said bolt said nuts are first screwed together. Then after they have been forced to the desired position on a bolt the nut C is given a further slight forward or backward turn, jamming it in position, as before explained.

It will be understood that in practically manufacturing these nuts, as shown in Figs. 1, 2, and 3, the wedge surfaces formed thereon are helical. It is obvious that this construction of nuts is equally applicable to pieces made to be screwed into threaded recesses, and it will be understood, further, that the invention is not confined to the nuts or screws having any particular form of thread, as it may with equal advantage be adapted to triangular or square threaded screws, as well as to modifications of these designs. If it is desired to increase the bearing-surface between the two nuts, the adjacent faces of the same may be made in corrugated form, as illustrated at $b^4$ and $c^3$ in Fig. 5 of the drawings.

It is known to be old to provide wedge faces between a nut and its washer, and it will be understood that my device is an improvement on such old idea. In my invention it is to be noted that the main nut is first placed with the auxiliary nut in the desired position on the bolt, and then the said main nut being held stationary by the engagement of its face $b^2$ with the flat surface the auxiliary nut is further turned, thus effectually jamming the two nuts on the threads of the bolt and that without the need of a second wrench.

I claim as my invention—

1. A pair of nuts each threaded and having a wedge bearing upon each other, the said wedge having a pitch the reverse of that of the thread to which the thread on the nuts is adapted, substantially as described.

2. The combination of two threaded nuts, their adjacent faces being parallel and constructed to form helical surfaces, the pitch of said surfaces being opposite to that of the threads to which the threads on the nuts are constructed to fit, substantially as described.

3. The combination of two threaded nuts having their adjacent bearing-faces constructed to form helical surfaces, said faces being corrugated and parallel to each other.

In testimony whereof I have signed my name to this specification in the presence of two subscribing witnesses.

WILLIAM HANSON.

Witnesses:
JAMES C. KRAYER,
JOS. H. KLEIN.